US009990108B2

(12) United States Patent
Henderson et al.

(10) Patent No.: US 9,990,108 B2
(45) Date of Patent: Jun. 5, 2018

(54) READ ACTIVITY OF CHAT ROOMS

(71) Applicant: Cisco Technology, Inc., San Jose, CA (US)

(72) Inventors: Andrew Henderson, Spiddal (IE); Edward McMullin, Oranmore (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 255 days.

(21) Appl. No.: 15/083,340

(22) Filed: Mar. 29, 2016

(65) Prior Publication Data

US 2017/0285885 A1 Oct. 5, 2017

(51) Int. Cl.
| | |
|---|---|
| *G06F 3/0482* | (2013.01) |
| *H04L 29/06* | (2006.01) |
| *H04L 12/58* | (2006.01) |
| *G06F 3/0488* | (2013.01) |
| *H04L 12/18* | (2006.01) |

(52) U.S. Cl.
CPC .......... *G06F 3/0482* (2013.01); *G06F 3/0488* (2013.01); *H04L 12/1827* (2013.01); *H04L 51/04* (2013.01); *H04L 65/403* (2013.01)

(58) Field of Classification Search
CPC .................................................. G06F 3/0482
See application file for complete search history.

(56) References Cited

U.S. PATENT DOCUMENTS

| | | |
|---|---|---|
| 7,860,928 B1 | 12/2010 | Anderson |
| 8,898,235 B2 | 11/2014 | Dietz |
| 2013/0212202 A1 | 8/2013 | Lee |
| 2015/0178626 A1 | 6/2015 | Pielot et al. |

OTHER PUBLICATIONS

BIBA, BIBA Blog, Group Messaging, Video Conferencing and More (2014) Can be seen at: https://www.biba.com/blog/group-messaginf-video-conferencing-and-more.
Constine, Josh; Facebook Messenger Shows Its New Speed With Facepile Read Receipts (Dec. 19, 2014).
Taylor, Gabrielle; How to block Yourseld From Being 'Seen'By Facebook's New Read Receipts Feature (2012) Can be seen at: http://digiwonk.wonderhowto.com/how-to/block-yourself-from-being-seen-by-facebooks-new-read-receipts-feature-0138824/.
Woollaston, Victoria; No Excuse to Ignore Your Whatsapp Messages!(Nov. 6, 2014) Can be seen at: http://www.dailymail.co.uk/sciencetech/article-2823405/Now-s-no-excuse-ignore-messages-Whatsapp-update-reveals-post-read-precise-time-opended.html.

*Primary Examiner* — Peiyong Weng
(74) *Attorney, Agent, or Firm* — Polsinelli PC (57) ABSTRACT

In one embodiment, method includes receiving data including chat room data from a chat room server, receiving input data from at least one input device, preparing a user interface screen including a chat room list including chat room panels, each one chat room panel including information about a different chat room from a plurality of chat rooms and a chat room icon of the different chat room, wherein a first chat room panel includes an indication of how many chat room members of a first chat room from the plurality of chat rooms have read a first message posted in the first chat room. Related systems and methods are also included.

20 Claims, 7 Drawing Sheets

FIG. 7

READ ACTIVITY OF CHAT ROOMS

TECHNICAL FIELD

The present disclosure generally relates to read activity of chat rooms.

BACKGROUND

The term chat room, or chatroom, is primarily used to describe any form of synchronous conferencing, occasionally even asynchronous conferencing. The term can thus mean any technology ranging from real-time online chat and online interaction to fully immersive graphical social environments. The primary use of a chat room is to share information via text with a group of other users. The users in a particular chat room are generally connected via a shared interest or other similar connection. New technology has enabled the use of file sharing and webcam to be included in some programs.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a method including receiving data including chat room data from a chat room server, receiving input data from at least one input device, preparing a user interface screen for output to a display device, the user interface screen including a chat room list including a plurality of chat room panels, each one chat room panel of the plurality of chat room panels including information about a different chat room from a plurality of chat rooms and a chat room icon of the different chat room, wherein a first chat room panel of the plurality of chat room panels includes an indication of how many chat room members of a first chat room from the plurality of chat rooms have read a first message posted in the first chat room.

There is also provided in accordance with another embodiment of the present disclosure, a chat room server system including a graphics processing unit to prepare a user interface screen for output to a display device, the user interface screen including a chat room list including a plurality of chat room panels, each one chat room panel of the plurality of chat room panels including information about a different chat room from a plurality of chat rooms, a chat room icon of the different chat room, and a title of the different chat room, wherein a first chat room panel of the plurality of chat room panels includes an indication of how many chat room members of a first chat room from the plurality of chat rooms have read a first message posted in the first chat room, and a central processing unit to receive input data, interpret the input data to include selecting entry to, and posting the first message in, the first chat room.

DETAILED DESCRIPTION

Figure 1:
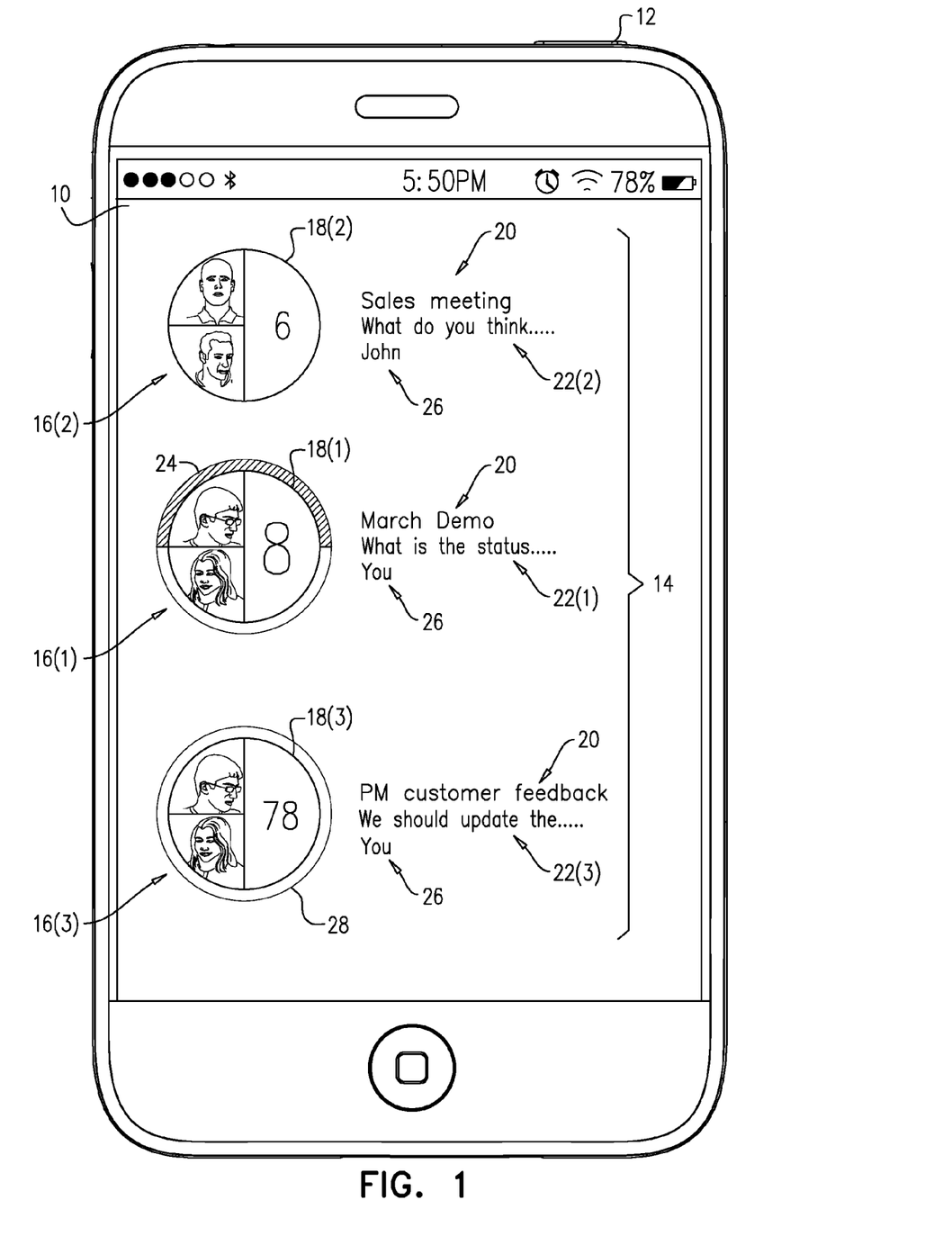
FIGS. 1-4 are views of a user interface screen, at various time periods, constructed and operative in accordance with an embodiment of the present disclosure.

FIGS. 1-4 are views of a user interface screen 10, at various time periods, constructed and operative in accordance with an embodiment of the present disclosure. Reference is now made to FIG. 1, which shows a user interface screen 10 run by a collaboration application on a mobile phone 12. The user interface screen 10 includes a chat room list 14. The chat room list 14 includes a plurality of chat room panels 16, individually labelled 16(1)-16(3). Each chat room panel 16 includes information about a different chat room from a plurality of chat rooms. The chat rooms may include one-to-one and group conversations. Each chat room panel 16 may include a chat room icon 18 of the chat room associated with that chat room panel 16, and a title 20 of the chat room associated with that chat room panel 16. Each chat room panel 16 may also include at least part of a most recent message 22 (individually labelled 22(1)-22(3)) posted in the chat room associated with that chat room panel 16, and a member identification 26 of who posted the most recent message 22 to that chat room. The chat room icon 18 (individually labelled 18(1)-18(3)) of a chat room panel 16 may include one or more avatars of members of the chat room associated with that chat room panel 16 and optionally list the number of members in that chat room. Only three chat room panels 16 are shown in the chat room list 14. It will be appreciated that any suitable number of chat room panels 16 may be included in the chat room list 14 depending on the size of the screen, icons and fonts, by way of example only.

A chat room panel 16(1) of the chat room panels 16 includes an indication 24, which may include a graphic representation, of how many chat room members of the chat room ("March Demo") associated with the chat room panel 16(1) have read the most recent message 22(1) posted in the chat room associated with the chat room panel 16(1) by a user ("You") of the mobile phone 12. The graphic representation shown in FIG. 1 extends around the chat room icon 18(1) of the chat room panel 16(1) as a function of how many chat room members of that chat room have read the most recent message 22(1) posted in that chat room by the user of the mobile phone 12. The graphic representation may extend as an arc around the chat room icon 18(1). An angular size of the arc is a function of how many chat room members of the chat room have read the most recent message 22(1) posted in that chat room. The arc may form an annular ring when 100% of the chat room members of the chat room have read the most recent message 22(1) posted in that chat room. In FIG. 1, the arc extends half way around the chat room icon 18 of the chat room panel 16(1) indicating that 50% of the members of the chat room have read the most recent message 22(1). The arc may be any suitable color and/or shading and/or pattern. The indication may additionally or alternatively include numerals to show how many members have read a posted message. Alternatively, the graphical representation may be implemented in any suitable form, for example, but not limited to, a bar indicator which indicates a fraction, percentage or number of how many members have read a posted message. Alternatively or additionally, the indication 24 may include a numeric representation of how many people have read the message, e.g., "5", "5" reads, or "5/8" to indicate that 5 members out of a chat room membership of 8 have read a posted message.

A chat room panel 16(2) of the chat room panels 16 does not include an indication of how many members have read the most recent message 22(2) posted to the chat room "Sales meeting" as the most recent message 22(2) was posted by someone other than the user of the mobile phone 12. In the example of FIG. 1, "John" posted the most recent message 22(2). It will be appreciated that the user interface screen 10 may be implemented to show a "read" indicator for all most recently posted messages of each chat room, even those not posted by the user of the mobile phone 12.

A chat room panel 16(3) of the chat room panels 16 includes an indication 28 (e.g., a circle thinner than the thickness of the indication 24) around the chat room icon 18(3) of the chat room panel 16(3). The indication 28 indicates that none of the members of the chat room associated with the chat room panel 16(3) have read the most recent message 22(3) posted in that chat room ("PM customer feedback") by the user ("You") of the mobile phone 12.

The indications 24, 28 enable the user of the mobile phone 12 to see how many chat room members of the respective chat rooms have read the most recent messages 22 posted to the various chat rooms at the chat room list 14 level without having to enter each chat room separately. This may be particularly useful for a manager wanting to see if the most recent message 22 has been seen by those who report to the manager. This increases the efficiency and speed of a system running the user interface screen 10, as the users do not need to enter each chat room separately in order to see how many chat room members of the respective chat rooms have read the most recent messages 22 posted to the various chat rooms. The increase in efficiency may be generated whether the user interface screen 10 is generated in a client device or in a cloud server, by way of example only. There may be an additional bandwidth saving as data for each chat room may not need to be downloaded to a client device unless the user selects to enter a chat room so by enabling the user of the mobile phone 12 to see how many chat room members of the respective chat rooms have read the most recent messages 22 posted to the various chat rooms at the chat room list 14 level, the need for downloading certain chat room data may be reduced.

Figure 2:
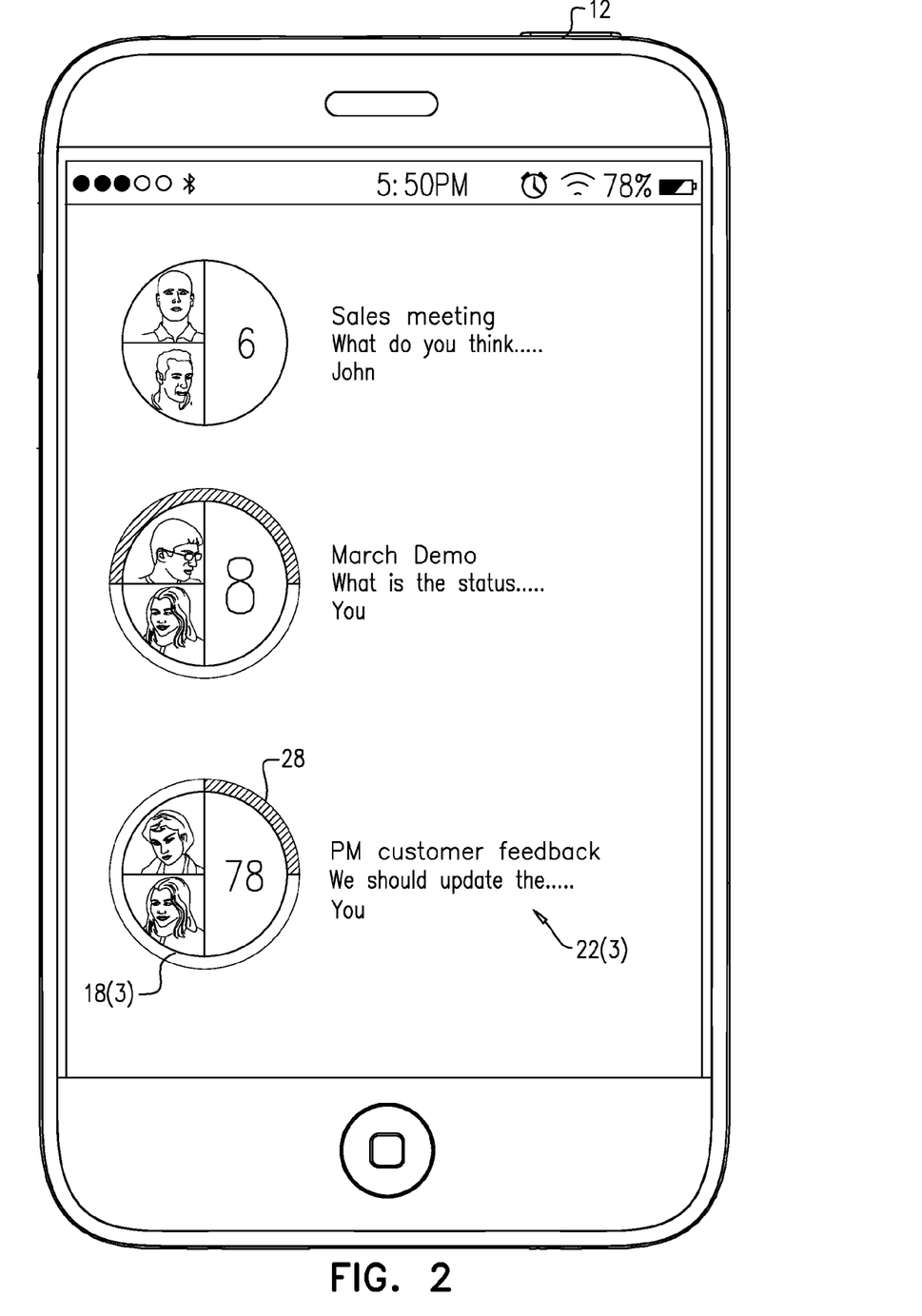

Reference is now made to FIG. 2. At a later time, than the time of FIG. 1, 25% of the members of the "PM customer feedback" chat room have read the most recent message 22(3) posted by the user of the mobile phone 12. This is indicated by the indication 28 now extending 25% (a 90 degree arc) around the chat room icon 18(3).

Figure 3:
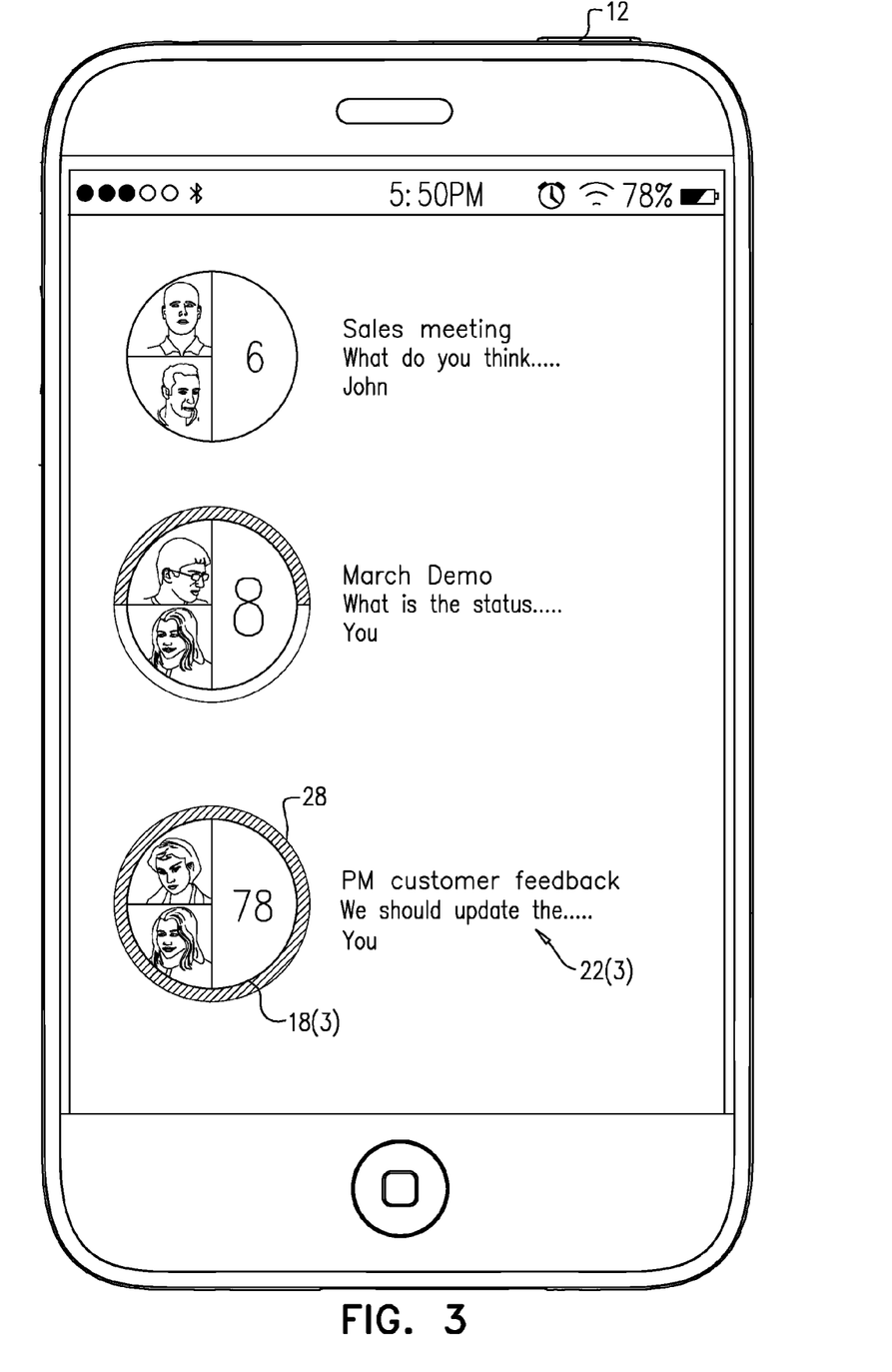

Reference is now made to FIG. 3. At a still later time, 100% of the members of the "PM customer feedback" chat room have read the most recent message 22(3) posted by the user of the mobile phone 12. This is indicated by the indication 28 now extending 100% (a 360 degree arc) around the chat room icon 18(3).

Figure 4:
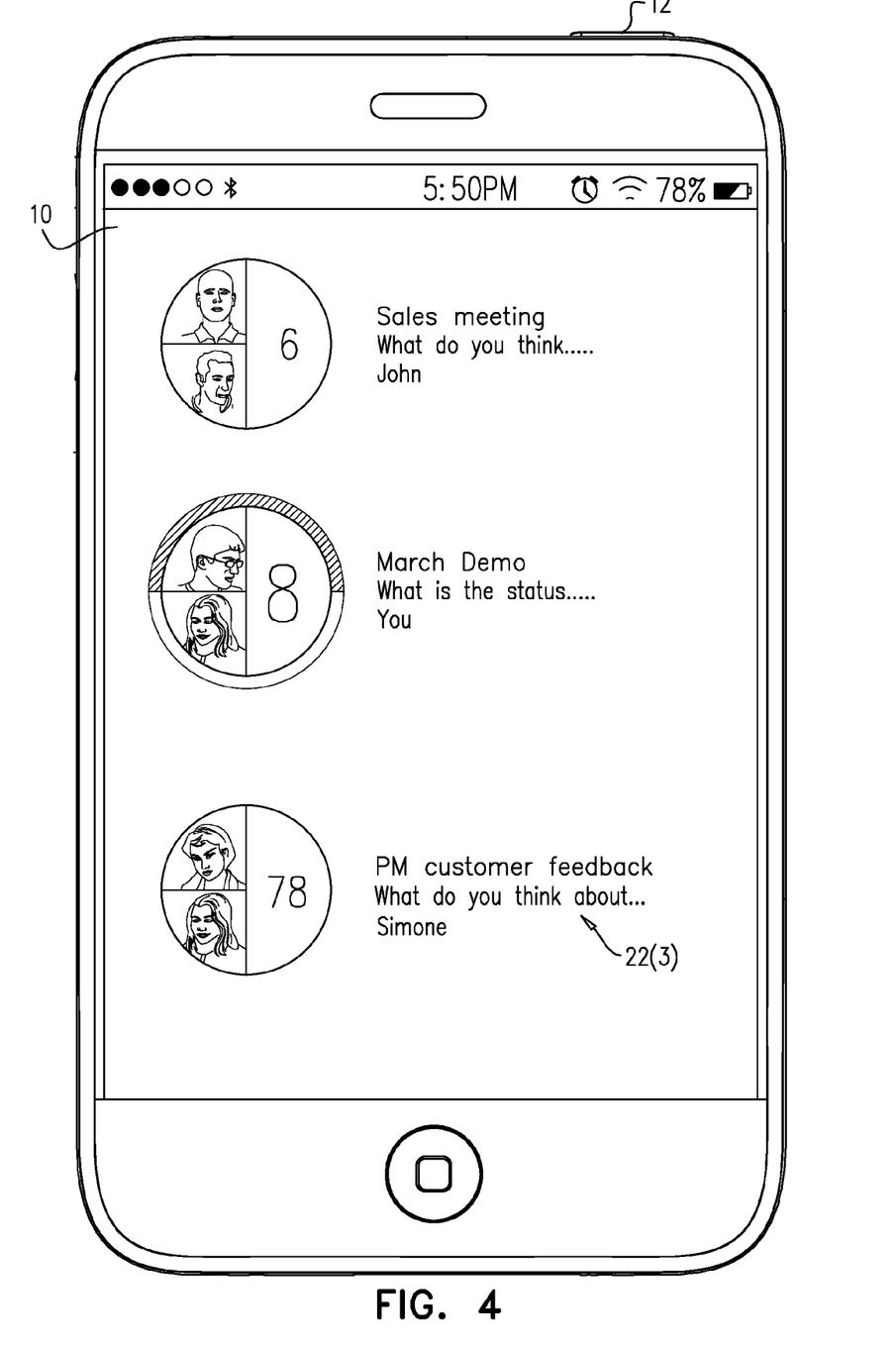

Reference is now made to FIG. 4. FIG. 4 shows that the most recent message 22(3) was posted by Simone and not by the user of the mobile phone 12. Therefore, the indication 28 (FIG. 3) has now been removed from the user interface screen 10. As mentioned above, it will be appreciated that the user interface screen 10 may be implemented to show a "read" indicator for all most recently posted messages, even those not posted by the user of the mobile phone 12. In such a case, the indication 28 for other members besides the user of the mobile phone 12 may be shown using a different color and/or shading and/or pattern, than is used for the user of the mobile phone 12, by way of example only.

Figure 5:
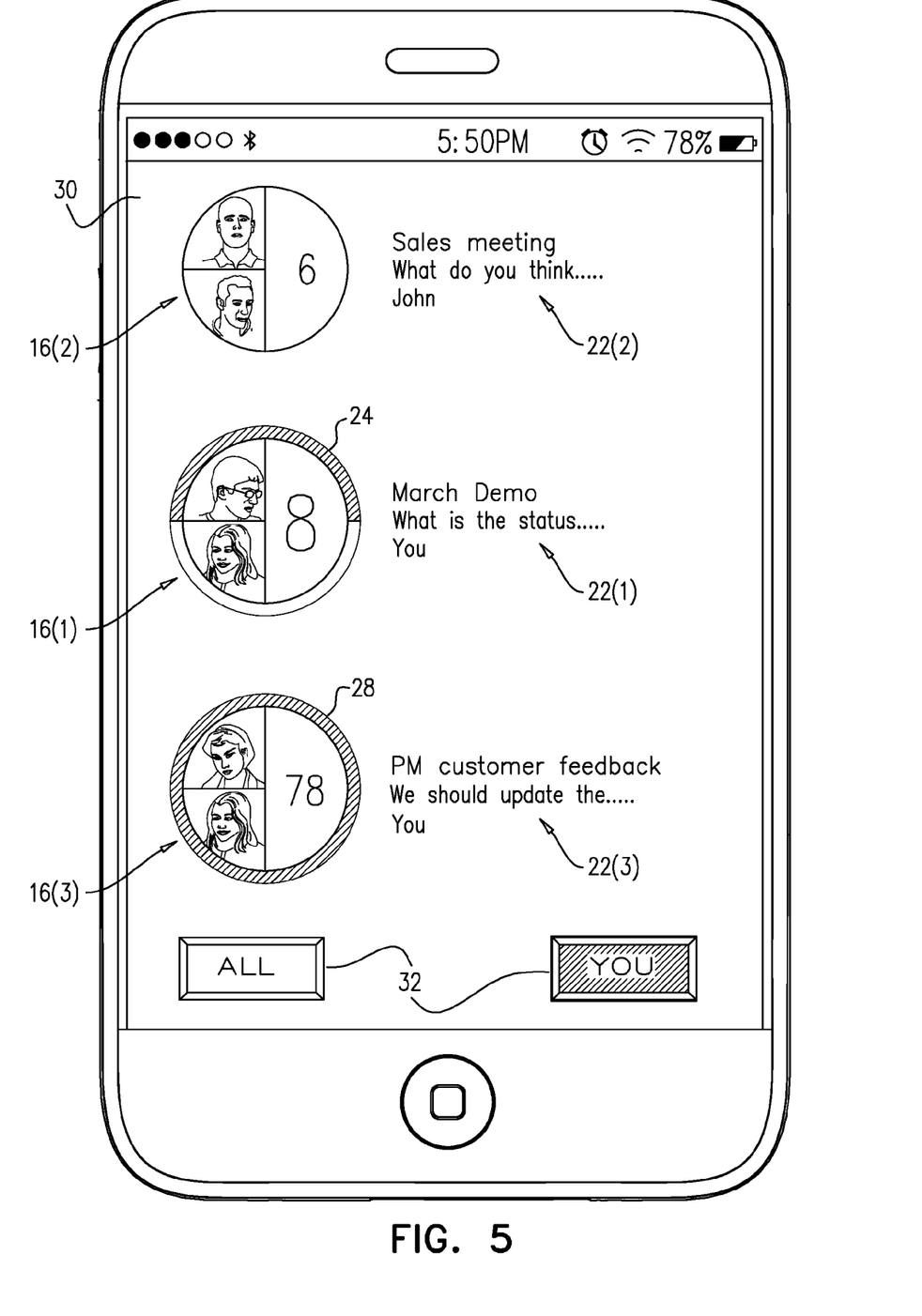
FIG. 5 is a view of a user interface screen constructed and operative in accordance with an alternative embodiment of the present disclosure.

Reference is now made to FIG. 5, which is a view of a user interface screen 30 constructed and operative in accordance with an alternative embodiment of the present disclosure. The user interface screen 30 is substantially the same as the user interface screen 10 (FIGS. 1-4) except that the user interface screen 30 includes a plurality of toggle buttons 32 ("ALL" and "YOU") to toggle between showing: (a) the most recent message 22 posted in each chat room independent of who posted the most recent message 22 by selecting the "ALL" toggle button 32; and (b) the most recent message 22 posted by one user (e.g. the user who is using the user interface screen 10, i.e., the user interface screen 30 shows the most recent messages posted by "You") for all of the chat rooms where the one user, e.g., "You", has posted a message by selecting the "YOU" toggle button 32. In some embodiments the "one user" may be selected to be any one of the members of the chat rooms.

In the example of FIG. 5 the user interface screen 30 is showing most recent messages 22(1), 22(3) posted by "You" except for in the chat room panel 16(2) where "You" has not posted any message to date. The indications 24, 28 are shown in FIG. 5 only for the chat room panels 16(1) and 16(3) where the user "You" has posted messages in the past. The indications 24, 28 show the "read" status of the latest messages posted by "You" even if someone else has already posted a more recent message, for example, in the case of the chat room of chat room panel 16(3), Simone posted the most recent message 22(3) (FIG. 4) after "You". However, as the "You" toggle button 32 has been selected in FIG. 5, most recent message 22(3) posted by "You" is shown along with the reading indication 28 for the most recent message 22(3) posted by "You". It will be appreciated that the toggle buttons 32 may be replaced by a single toggle button which provides the same functionality as the toggle buttons 32.

Figure 6:
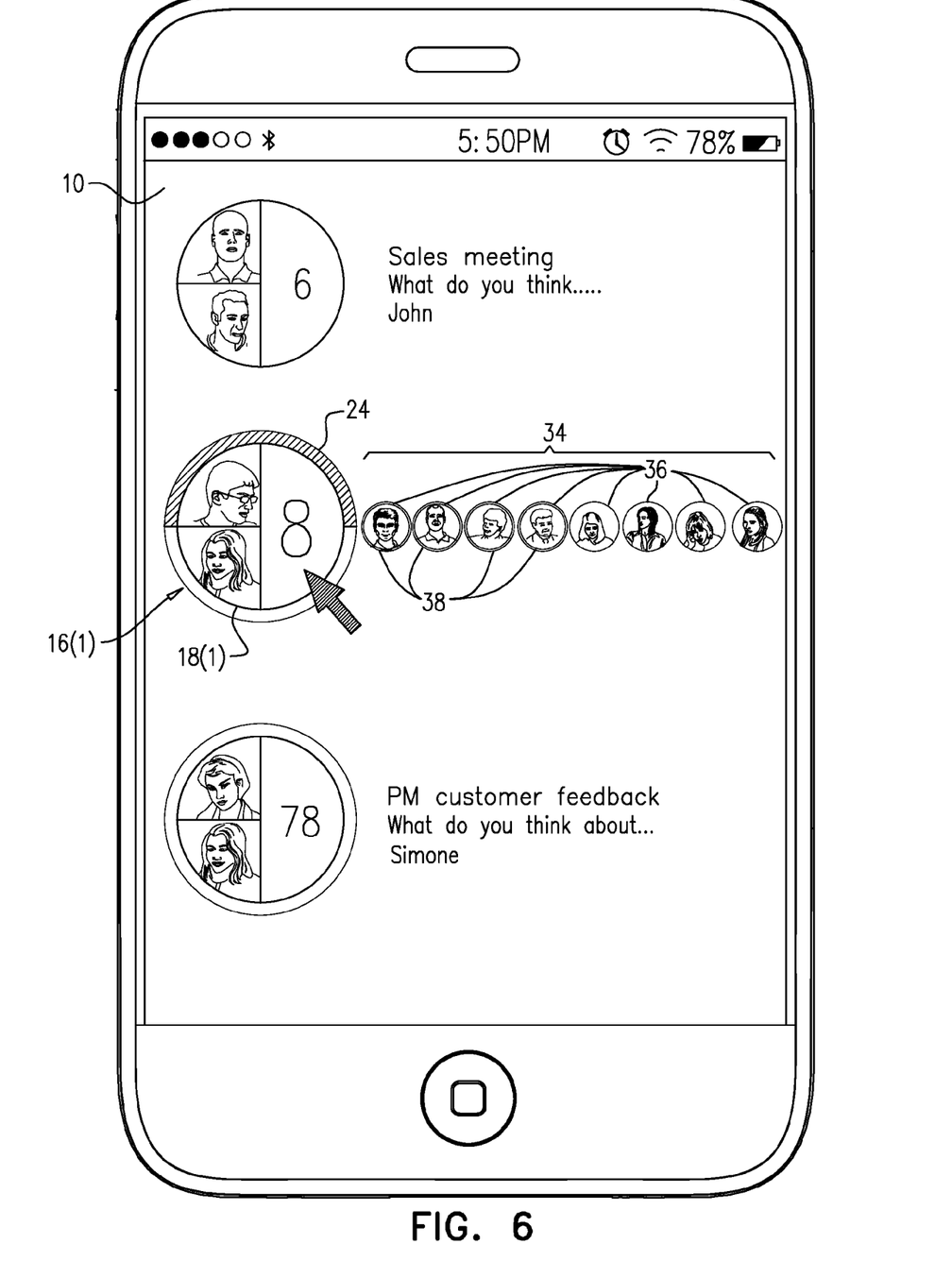
FIG. 6 is a view of the user interface screen of FIG. 1 showing more information about which members have read a message.

Reference is now made to FIG. 6, which is a view of the user interface screen 10 of FIG. 1 showing more information 34 about which members of the chat room of the chat room panel 16(1) have read the most recent message 22(1) (FIG. 4) and which members of the chat room have not read the most recent message 22(1). The additional information 34 may be selected by the user hovering over the chat room icon 18(1) or by any other suitable user selection. If the information 34 is selected by hovering etc., the user interface screen 10 is updated to further include a representation 36, e.g., an avatar, of each of the members of the chat room of the chat room panel 16(1) and an indication 38 of which of the members of that chat room have read the most recent message 22(1). The indication 38 may include disposing a shape around the representation 36 (e.g., the avatar) of each of the members of that chat room that have read the most recent message 22(1). The shape is typically a circular shape disposed around the chat room panel 16(1) and may be colored and/or shaded. Using the same color and/or shading and/or pattern for the indications 38 and the indication 24 may help reinforce the notion that the chosen color and/or shade means that the most recent message 22(1) has been read. The representations 36 without the indication 38 belong to the members of the chat room who have not yet read the most recent message 22(1). It will be appreciated that the indications 38 may be replaced by other methods of indication, for example, but not limited to, using check marks and/or making the representations 36 of the members who have read the most recent message 22(1) larger than the representations 36 of the members who have not read the most recent message 22(1).

Chat room members may be encouraged to participate in the chat rooms by a form of 'gamification' by ordering the representations 36 of the members in the information 34 by engagement as will be described in more detail below. The representations 36 of the members may be ordered according to which members of the chat room of the chat room panel 16(1) have read the most recent message 22(1) (FIG. 4) and which of the members of that chat room have not read the most recent message 22(1). Additionally, the representations 36 of the members of the chat room of the chat room panel 16(1) may be ordered, at a second sort level, according to an engagement of each of the members in that chat room. The engagement may be measured by number of messages posted and/or messages read in that chat room or all chat rooms, by way of example only. Alternatively, the representations 36 of the members may be ordered according to an engagement of each of the members in the chat room and not by whether the most recent message 22(1) has been read or not.

In FIG. 6, the representation 36 closest to the chat room icon 18(1) belongs to a member who has read the post and is also the most engaged in this chat room. The representation 36 which is fifth from the chat room icon 18(1) belongs to a member who has not read the most recent message 22(1) but is the most engaged member of those who have not read the most recent message 22(1) (FIG. 4). The representation 36 which is eighth from the chat room icon 18(1) belongs to a member who has not read the most recent message 22(1) and is the least engaged member of those who have not read the most recent message 22(1).

Figure 7:
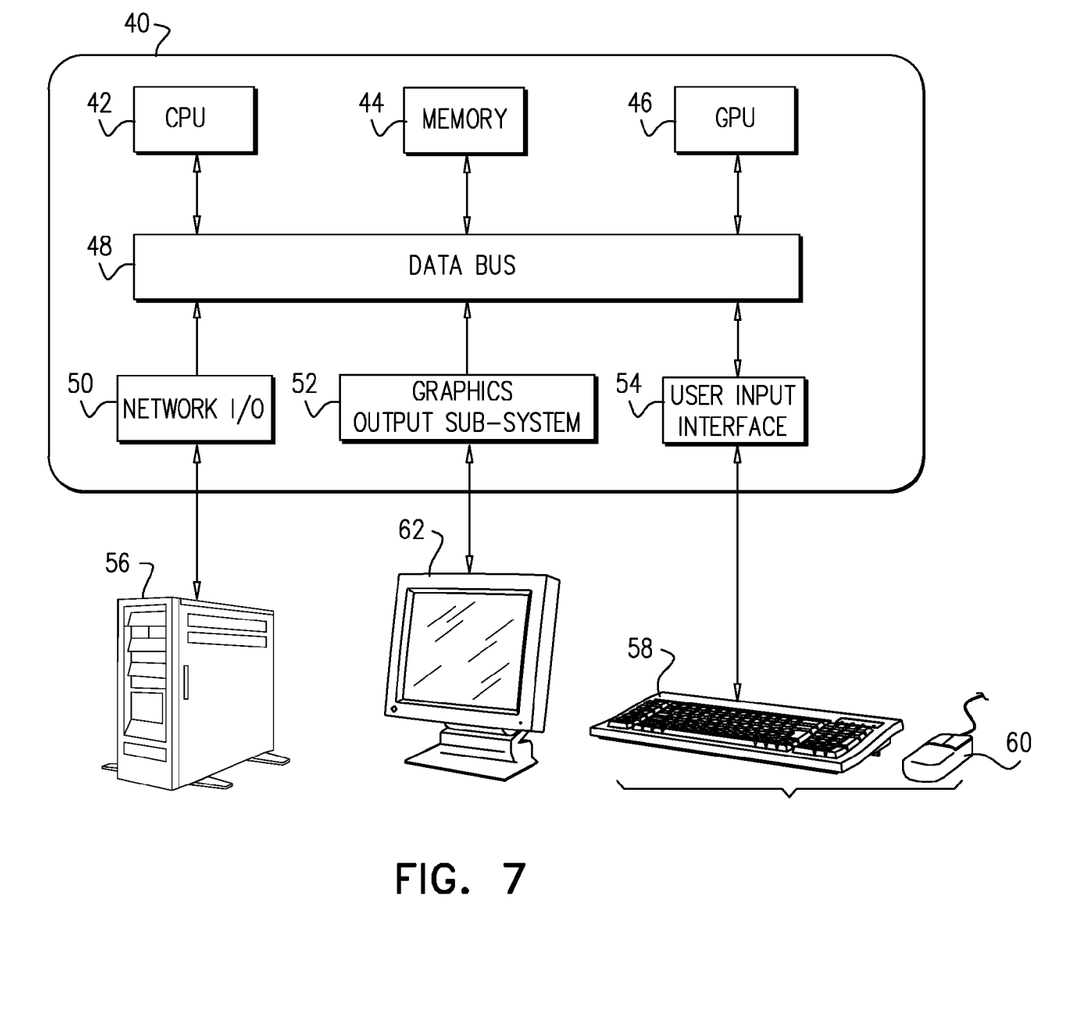
FIG. 7 is partly pictorial, partly block diagram view of a chat room client device constructed and operative in accordance with an embodiment of the present disclosure.

Reference is now made to FIG. 7, which is partly pictorial, partly block diagram view of a chat room client system 40 constructed and operative in accordance with an embodiment of the present disclosure. The chat room client system 40 includes a central processing unit (CPU) 42, a memory 44, a graphics processing unit (GPU) 46, a data bus 48, a network input/output interface 50, a graphics output subsystem 52 and a user input interface 54. The chat room client system 40 may be implemented in any suitable processing device, for example, but not limited to, a smart phone, a tablet device, a laptop computer or a desk top computer.

The network input/output interface 50 is operative to receive, from a chat room server 56, data including chat room data (e.g., chat room lists, chat room titles, chat room messages, chat room icons, member icons/avatars) and data indicating how many chat room members of one or more chat rooms have read a message (e.g., a latest posted message) posted in the relevant chat room. The network input/output interface 50 may be a wired and/or wireless network interface.

The user input interface 54 is operative to receive input data from at least one input device, for example, but not limited to, a keyboard 58, a mouse 60 and/or a touchscreen. The input data may indicate a screen position (e.g., a screen position of a cursor or a finger or a stylus) and/or a mouse click or an equivalent selection command and/or keyboard input, by way of example only. When the chat room client device 40 is implemented in a smart phone the user input interface 54 may receive the input data from a touchscreen of the smart phone.

The GPU 46 is operative to prepare the user interface screen 10 (FIG. 1-4, 6), 30 (FIG. 5) for output to a display device 62. The GPU 46, apart from utilizing the data received from the chat room server 56 in preparing the user interface screen 10, 30, typically customizes the user interface screen 10, 30 according to specifications of the display device 62. The graphics output sub-system 52 is operative to output the user interface screen 10, 30 to the display device 62. The display device 62 may be implemented as a standalone monitor as shown in FIG. 7, as a display integrated into the chat room client system 40 typically incorporating a touchscreen (for example, when the chat room client device 40 is implemented in a smart phone), or as a projector and screen arrangement, by way of example only. The GPU 46 may be implemented in the CPU 42.

The CPU 42 is operative to receive the input data from the user input interface 54 and interpret the input data, for example, based on a screen position (e.g., a screen position of a cursor or a finger or a stylus), to include selecting entry to, and/or posting a message to, the chat room associated with the screen position. The CPU 42 may also pre-process received chat room data for forwarding to the GPU 46. The network input/output interface 50 is operative to send messages posted by the user of the chat room client system 40 to the chat room server 56. The memory 44 is operative to store data used by the CPU 42 and the GPU 46 and other elements of the chat room client system 40, as necessary. The data bus 48 is operative to connect the various elements of the chat room client system 40 for data connection purposes.

The CPU 42 is operative to calculate a proximity of a screen position (e.g., a position of a cursor or a finger or a stylus) with the chat room icon 18(1) (FIG. 6) of the chat room panel 16(1) (FIG. 6) and based on the proximity, to interpret the input data to include selecting more information 34 (FIG. 6) about the indication 38 of how many chat room members of the chat room associated with the chat room panel 16(1) have read the most recent message 22(1) (FIG. 1) posted in that chat room. The GPU 46 is operative to prepare the user interface screen 10 (FIG. 6) to further include the representation 36 of each of the members of that chat room and an indication of which of the members of that chat room have read the most recent message 22(1) by disposing a shape around the representation 36, e.g., avatar, of each of the members of that chat room that have read the most recent message 22(1) or using any suitable indication.

In accordance with an alternative embodiment, the user interface screen 10, 30 may be initially prepared by the chat room server 56. The chat room server 56 may comprise a CPU which may be operative to receive the user input from the user input interface 54 of the chat room client system 40. The chat room server 56 may also include a GPU to prepare the user interface screen 10, 30 based on the chat room data and transmit the user interface screen 10, 30 to the chat room client system 40. The user interface screen 10 may then be formatted by the GPU 46 of the chat room client system 40 according to the specifications of the display device 62.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A method comprising:
receiving data including chat room data from a chat room server;
receiving input data from at least one input device;
preparing a user interface screen for output to a display device, the user interface screen including a chat room list including a plurality of chat room panels, each one chat room panel of the plurality of chat room panels including information about a different chat room from a plurality of chat rooms; and a chat room icon of the different chat room, wherein a first chat room panel of the plurality of chat room panels includes an indication of how many chat room members of a first chat room from the plurality of chat rooms have read a first message posted in the first chat room.

2. The method according to claim 1, further comprising:
interpreting the input data to include selecting entry to, and posting the first message in, the first chat room; and
sending the first message to the chat room server.

3. The method according to claim 1, wherein the indication includes a graphic representation of how many chat room members of the first chat room have read the first message posted in the first chat room.

4. The method according to claim 3, wherein the graphic representation extends around the chat room icon of the first chat room panel as a function of how many chat room members of the first chat room have read the first message posted in the first chat room.

5. The method according to claim 4, wherein the graphic representation extends as an arc around the chat room icon, an angular size of the arc being a function of how many chat room members of the first chat room have read the first message posted in the first chat room, the arc forming an annular ring when 100% of the chat room members of the first chat room have read the first message posted in the first chat room.

6. A system comprising:
a network input/output interface to receive data including chat room data from a chat room server;
a user input interface to receive input data from at least one input device;
a graphics processing unit to prepare a user interface screen for output to a display device, the user interface screen including a chat room list including a plurality of chat room panels, each one chat room panel of the plurality of chat room panels including information about a different chat room from a plurality of chat rooms; a chat room icon of the different chat room; and a title of the different chat room, wherein a first chat room panel of the plurality of chat room panels includes an indication of how many chat room members of a first chat room from the plurality of chat rooms have read a first message posted in the first chat room; and
a central processing unit to: receive the input data from the user input interface; and interpret the input data to include selecting entry to, and posting the first message in, the first chat room, wherein the network input/output interface is operative to send the first message to the chat room server.

7. The system according to claim 6, wherein the first chat room panel includes at least part of the first message posted in the first chat room.

8. The system according to claim 6, wherein the indication includes a graphic representation of how many chat room members of the first chat room have read the first message posted in the first chat room.

9. The system according to claim 8, wherein the graphic representation extends around the chat room icon of the first chat room panel as a function of how many chat room members of the first chat room have read the first message posted in the first chat room.

10. The system according to claim 9, wherein the graphic representation extends as an arc around the chat room icon, an angular size of the arc being a function of how many chat room members of the first chat room have read the first message posted in the first chat room, the arc forming an annular ring when 100% of the chat room members of the first chat room have read the first message posted in the first chat room.

11. The system according to claim 6, wherein the network input/output interface is operative to receive, from the chat room server, data indicating how many chat room members of the first chat room have read the first message posted in the first chat room.

12. The system according to claim 6, further comprising a graphics output sub-system to output the user interface screen to a display device.

13. The system according to claim 6, wherein:
the central processing unit is operative to interpret the input data to include selecting more information about the indication of how many chat room members of the first chat room have read the first message posted in the first chat room; and
based on the interpretation of the input data, the graphics processing unit is operative to prepare the user interface screen to further include a representation of each of the members of the first chat room and an indication of which of the members of the first chat room have read the first message.

14. The system according to claim 13, wherein the input data indicates a screen position, the central processing unit is operative to calculate a proximity of the screen position with the chat room icon of the first chat room panel and based on the proximity to interpret the input data as selecting more information about the indication of how many chat room members of the first chat room have read the first message posted in the first chat room based on.

15. The system according to claim 13, wherein: the representation of each one member of the members includes an avatar of the one member; and the graphics processing unit is operative to prepare the user interface screen to further include the indication of which of the members of the first chat room have read the first message by disposing a shape around the avatar of each of the members of the first chat room that have read the first message.

16. The system according to claim 13, wherein the representations of the members are ordered according to which of the members of the first chat room have read the first message and which of the members of the first chat room have not read the first message.

17. The system according to claim 16, wherein the representations of the members are ordered, at a second sort level, according to an engagement of each of the members in the first chat room.

18. The system according to claim 13, wherein the representations of the members are ordered according to an engagement of each of the members in the first chat room.

19. The system according to claim 6, wherein the graphics processing unit is operative to prepare the user interface screen to further include at least one toggle button to toggle between showing: a most recent message posted in each one chat room of the plurality of chat rooms independent of who posted the most recent message; and a most recent message posted by one user for all of the chat rooms where the one user has posted a message.

20. A chat room server system comprising:
a graphics processing unit to prepare a user interface screen for output to a display device, the user interface screen including a chat room list including a plurality of chat room panels, each one chat room panel of the plurality of chat room panels including information about a different chat room from a plurality of chat rooms; a chat room icon of the different chat room; and a title of the different chat room; wherein a first chat room panel of the plurality of chat room panels includes an indication of how many chat room members of a first chat room from the plurality of chat rooms have read a first message posted in the first chat room; and
a central processing unit to: receive input data; interpret the input data to include selecting entry to, and posting the first message in, the first chat room.

* * * * *